(12) United States Patent
Tuli et al.

(10) Patent No.: US 12,520,224 B2
(45) Date of Patent: Jan. 6, 2026

(54) TELECOMMUNICATIONS NETWORK PERFORMANCE SYSTEMS AND METHODS

(71) Applicant: T-Mobile USA, Inc., Bellevue, WA (US)

(72) Inventors: Ashish Tuli, Ashburn, VA (US); Heitor Almeida, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/326,952

(22) Filed: May 31, 2023

(65) Prior Publication Data

US 2024/0406836 A1    Dec. 5, 2024

(51) Int. Cl.
*H04W 24/02* (2009.01)
*H04W 40/20* (2009.01)

(52) U.S. Cl.
CPC ........... *H04W 40/20* (2013.01); *H04W 24/02* (2013.01)

(58) Field of Classification Search
CPC .............................. H04W 40/20; H04W 24/02
See application file for complete search history.

(56) References Cited

U.S. PATENT DOCUMENTS

| | | |
|---|---|---|
| 6,108,533 A | 8/2000 | Brohoff |
| 7,363,041 B2 | 4/2008 | Bonnard et al. |
| 7,606,583 B2 | 10/2009 | Spriestersbach |
| 7,869,953 B1 | 1/2011 | Kelly et al. |
| 7,994,926 B2 | 8/2011 | Longman et al. |
| 8,014,362 B2 | 9/2011 | Panico et al. |
| 8,185,122 B2 | 5/2012 | Guill |
| 8,200,251 B2 | 6/2012 | Huang |
| 8,295,244 B2 | 10/2012 | Francalanci et al. |
| 8,340,628 B2 | 12/2012 | Taylor et al. |
| 8,423,047 B1 | 4/2013 | Zang et al. |
| 8,437,765 B2 | 5/2013 | Yang et al. |
| 8,447,326 B2 | 5/2013 | Huang et al. |
| 8,478,289 B1 | 7/2013 | Lookingbill et al. |
| 8,504,059 B2 | 8/2013 | Huang et al. |
| 8,526,961 B2 | 9/2013 | Sanders et al. |
| 8,571,580 B2 | 10/2013 | Altman et al. |

(Continued)

FOREIGN PATENT DOCUMENTS

| | | |
|---|---|---|
| CN | 113647055 A | 11/2021 |
| CN | 109348488 B | 2/2022 |

(Continued)

*Primary Examiner* — Gbemileke J Onamuti
(74) *Attorney, Agent, or Firm* — Perkins Coie LLP

(57) ABSTRACT

Systems and methods for improving telecommunications network performance are disclosed. The system selects a geographic area from a set of geographic areas, where the geographic area satisfies a network-ready condition. The system obtains user-mobility data indicating movement of user locations from the selected geographic area to other geographic areas. The system generates a set of neighboring geographic areas using the user-mobility data, where each neighboring geographic area satisfies a network-traffic condition. The system filters the set of neighboring geographic areas using a threshold distance. The system determines a user-mobility metric for the selected geographic area using the user-mobility data. In response to the user-mobility metric satisfying a user-mobility metric threshold value, the system deploys one or more telecommunications network resources to the selected geographic area.

20 Claims, 6 Drawing Sheets

(56) References Cited

U.S. PATENT DOCUMENTS

| | | |
|---|---|---|
| 8,634,860 B2 | 1/2014 | Huang et al. |
| 8,655,371 B2 | 2/2014 | Huang |
| 8,660,576 B2 | 2/2014 | Huang |
| 8,666,390 B2 | 3/2014 | Meredith et al. |
| 8,897,803 B2 | 11/2014 | Pylappan et al. |
| 8,958,823 B2 | 2/2015 | Ortiz |
| 9,171,301 B1 | 10/2015 | Gupta et al. |
| 9,319,836 B2 | 4/2016 | Jodlauk et al. |
| 9,336,679 B1 | 5/2016 | Chitale et al. |
| 9,392,508 B2 | 7/2016 | Senarath et al. |
| 9,408,083 B2 | 8/2016 | Riesenberg et al. |
| 9,432,865 B1 | 8/2016 | Jadunandan et al. |
| 9,584,968 B2 | 2/2017 | Barrand et al. |
| 9,585,036 B1 | 2/2017 | Tektumanidze et al. |
| 9,596,639 B2 | 3/2017 | Bengtsson et al. |
| 9,679,487 B1 | 6/2017 | Hayward |
| 9,686,692 B2 | 6/2017 | Guday et al. |
| 9,706,411 B2 | 7/2017 | Goswami et al. |
| 9,760,237 B2 | 9/2017 | Eraker et al. |
| 9,761,137 B2 | 9/2017 | Beaurepaire et al. |
| 9,769,674 B2 | 9/2017 | Uelk et al. |
| 9,842,334 B1 | 12/2017 | Magi et al. |
| 9,854,408 B2 | 12/2017 | Suthar et al. |
| 9,900,392 B2 | 2/2018 | Green et al. |
| 9,924,340 B1 | 3/2018 | Ren et al. |
| 9,928,741 B2 | 3/2018 | Harris et al. |
| 9,930,537 B2 | 3/2018 | Ljung et al. |
| 9,955,298 B1 | 4/2018 | Haney |
| 10,033,847 B2 | 7/2018 | Osman et al. |
| 10,045,158 B2 | 8/2018 | Dicke et al. |
| 10,080,141 B2 | 9/2018 | Buchmayer et al. |
| 10,187,343 B2 | 1/2019 | Maginnis et al. |
| 10,192,242 B1 | 1/2019 | Duque De Souza |
| 10,229,434 B2 | 3/2019 | Cheng et al. |
| 10,318,973 B2 | 6/2019 | Milton et al. |
| 10,349,205 B2 | 7/2019 | Glover et al. |
| 10,356,707 B2 | 7/2019 | Liang et al. |
| 10,380,636 B2 | 8/2019 | Polachi |
| 10,390,180 B1 | 8/2019 | Li et al. |
| 10,425,832 B1 | 9/2019 | Zawadzki et al. |
| 10,498,378 B1 | 12/2019 | Freedman et al. |
| 10,509,096 B2 | 12/2019 | Lin |
| 10,559,211 B2 | 2/2020 | Quitoriano et al. |
| 10,560,864 B2 | 2/2020 | Shaw et al. |
| 10,565,620 B1 | 2/2020 | Chadwick |
| 10,601,684 B2 | 3/2020 | Hashmi et al. |
| 10,623,256 B2 | 4/2020 | Zawadzki et al. |
| 10,631,198 B2 | 4/2020 | Zhang |
| 10,779,183 B2 | 9/2020 | Li et al. |
| 10,785,123 B2 | 9/2020 | Gonguet |
| 10,791,468 B2 | 9/2020 | Raj et al. |
| 10,817,889 B2 | 10/2020 | Zachariah et al. |
| 10,841,738 B2 | 11/2020 | Dhanabalan et al. |
| 10,939,444 B1 | 3/2021 | Bellamkonda et al. |
| 10,949,883 B2 | 3/2021 | Wan et al. |
| 10,993,081 B2 | 4/2021 | Mehran et al. |
| 11,044,579 B2 | 6/2021 | Chang et al. |
| 11,051,207 B2 | 6/2021 | Nieminen |
| 11,109,194 B1 | 8/2021 | Pinheiro et al. |
| 11,112,263 B2 | 9/2021 | Timor et al. |
| 11,206,513 B1 | 12/2021 | John et al. |
| 11,212,768 B2 | 12/2021 | Yang et al. |
| 11,270,324 B2 | 3/2022 | Milton et al. |
| 11,362,937 B2 | 6/2022 | She et al. |
| 11,538,127 B1 | 12/2022 | Lecocke et al. |
| 11,606,732 B1 | 3/2023 | Chandrasekaran |
| 2003/0040314 A1 | 2/2003 | Hogan et al. |
| 2004/0203867 A1 | 10/2004 | Schmidt |
| 2010/0069086 A1 | 3/2010 | Ahlin |
| 2010/0222066 A1 | 9/2010 | Du et al. |
| 2011/0176523 A1 | 7/2011 | Huang et al. |
| 2012/0284118 A1 | 11/2012 | Mamich et al. |
| 2013/0273921 A1 | 10/2013 | Kenington et al. |
| 2014/0164622 A1 | 6/2014 | Afshin |
| 2015/0100373 A1 | 4/2015 | Ignatyev et al. |
| 2015/0326624 A1 | 11/2015 | Rajendran et al. |
| 2016/0223333 A1 | 8/2016 | Thakur et al. |
| 2017/0024657 A1 | 1/2017 | Sahu et al. |
| 2017/0185685 A1 | 6/2017 | Brewer et al. |
| 2017/0192982 A1 | 7/2017 | Glover et al. |
| 2019/0392054 A1 | 12/2019 | Courtemanche et al. |
| 2021/0258792 A1 | 8/2021 | Rodriguez et al. |
| 2021/0352438 A1 | 11/2021 | Ford et al. |
| 2021/0389134 A1 | 12/2021 | Olthoff et al. |
| 2022/0067863 A1 | 3/2022 | Sheth et al. |
| 2022/0159511 A1 | 5/2022 | Vivanco et al. |
| 2022/0291011 A1 | 9/2022 | Selina et al. |
| 2022/0301011 A1 | 9/2022 | Maliszewski et al. |
| 2022/0351245 A1 | 11/2022 | Hardin et al. |
| 2022/0361002 A1 | 11/2022 | Bhaduri et al. |
| 2022/0373633 A1 | 11/2022 | Pylappan |
| 2023/0062010 A1 | 3/2023 | Malboubi et al. |
| 2023/0105365 A1 | 4/2023 | Jung |

FOREIGN PATENT DOCUMENTS

| | | |
|---|---|---|
| CN | 113382363 B | 8/2022 |
| EP | 2932625 B1 | 2/2020 |
| EP | 3721656 A1 | 10/2020 |
| JP | 5843960 B2 | 11/2015 |
| JP | 2020518886 A | 6/2020 |
| JP | 7068471 B2 | 5/2022 |
| KR | 20220160534 A | 12/2022 |
| WO | 2013011450 A1 | 1/2013 |
| WO | 2017193783 A1 | 11/2017 |
| WO | 2018026262 A2 | 2/2018 |
| WO | 2020098929 A1 | 5/2020 |
| WO | 2021188039 A1 | 9/2021 |
| WO | 2021239520 A1 | 12/2021 |
| WO | 2021259263 A1 | 12/2021 |

TELECOMMUNICATIONS NETWORK PERFORMANCE SYSTEMS AND METHODS

BACKGROUND

A wireless network, such as a cellular network, can include an access node (e.g., base station) servicing multiple wireless devices or user equipment (UE) in a geographical area covered by a radio frequency transmission provided by the access node. As technology has evolved, different carriers within the cellular network have utilized different types of radio access technologies (RATs). RATs can include, for example, 3G RATs (e.g., GSM, CDMA, etc.), 4G RATs (e.g., WiMax, Log Term Evolution (LTE, etc.), 5G RATs (New Radio (NR)). To ensure consistent coverage through a wide geographic range, existing technologies such as 4G are often used in combination with newer technologies such as 5GNR. However, while newer technologies may be increasingly deployed in urban and suburban areas, small town and rural areas may continue to be supported primarily through older technologies such as 4G LTE due to their decreased population compared to urban and suburban areas. Accordingly, small town and rural areas may inadvertently suffer from a lack of coverage as newer technologies are deployed to other, more populated geographic areas.

While older technologies may continue to support small town and rural areas, this alone does not ensure adequate and consistent coverage as new technologies are vastly superior to the older technologies. Without users moving to small town and rural areas, justifying the deployment of network resources is often troublesome. Accordingly, there is a need to evaluate small town and rural areas to ensure that such areas are able to receive network resources to provide adequate and consistent cellular network coverage.

BRIEF DESCRIPTION OF THE DRAWINGS

Detailed descriptions of implementations of the present invention will be described and explained through the use of the accompanying drawings.

Figure 1:
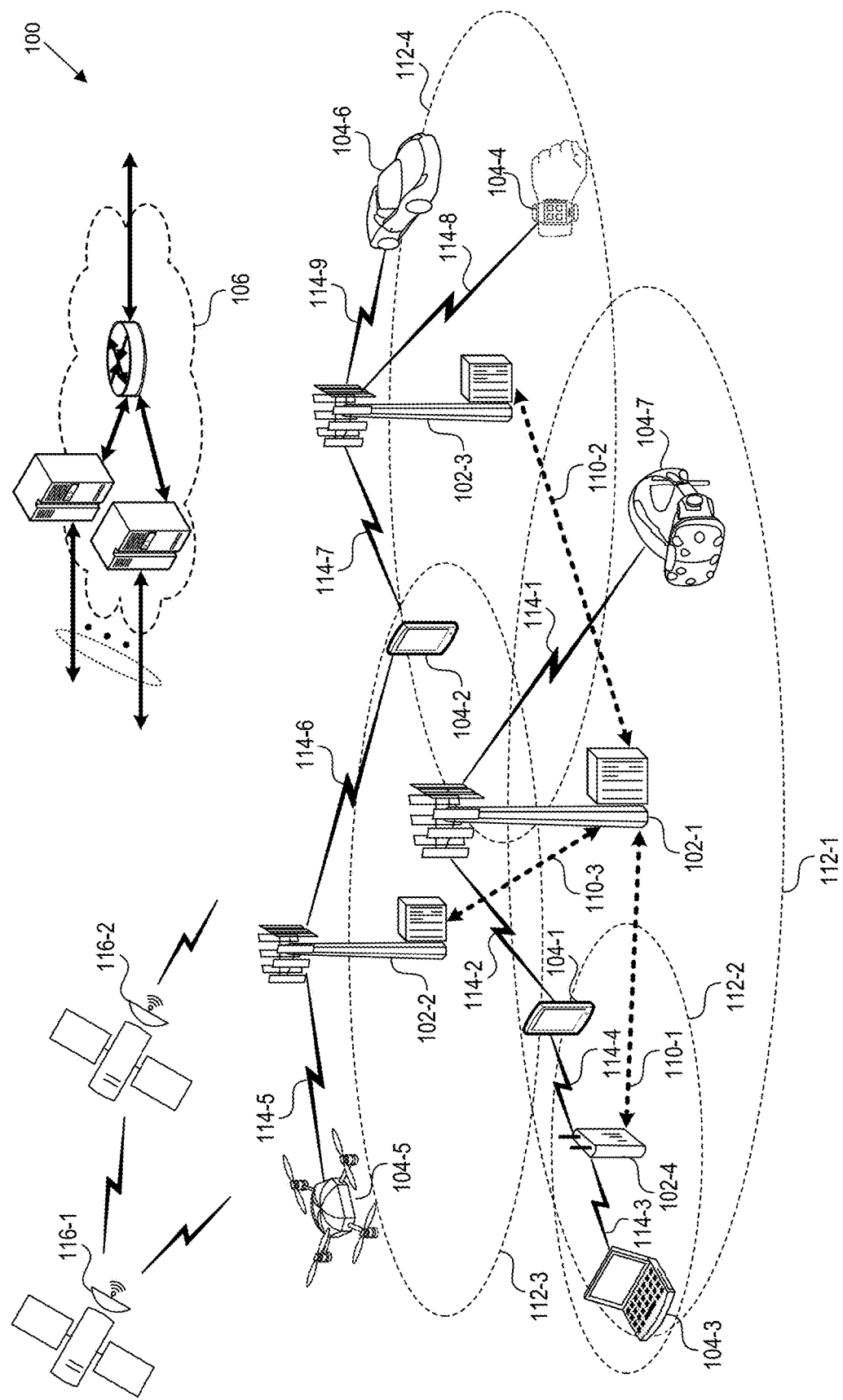
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To ensure adequate and consistent network coverage in underserved geographies and populations, such as small towns and rural geographic areas, deploying enhanced network resources (e.g., network antennas, wireless sites, etc.) can ensure that users within such areas experience better network connectivity. While existing systems that provide additional network resources to these geographies may enable a better user experience, resources for deploying network resources are limited and constrained by material shortages, property availability, and other factors. For example, small town and rural areas have low population densities and span large geographic areas. To ensure adequate network coverage in small towns and rural areas, a large amount of network resources needs to be deployed to such geographic areas. However, due to the limited availability of network resources, existing systems that relocate network resources from well-served geographies to underserved geographies cause a decreased user experience in the well-served geographies. Moreover, due to the range limitations of wireless sites, these sites must be positioned within proximity of one another to ensure adequate coverage. As underserved geographic areas are large, the amount of available sites to be deployed to such locations may be limited, further amplifying adequate network coverage issues.

Another common problem faced by existing systems is their lack of being able to accurately determine which geographic areas need additional network resources as opposed to other geographic areas to enhance network coverage. For example, existing systems may determine network performance of user devices within a given drive time (e.g., 30 minutes) of a given network resource (e.g., a cellular network tower). However, when considering underserved geographic areas (e.g., small towns and rural areas), drive times may largely vary, causing inaccurate performance metrics to be obtained. Moreover, special events, such as holidays, vacations, auto accidents, parades, or other events, further cause drive-time-based performance metrics to be skewed. Without accurate performance and/or coverage metrics, existing systems waste valuable network resources by misappropriating them to geographic areas that do not benefit the most from such resources, which further causes a decreased user experience in regard to network coverage and connectivity. This misappropriation of network resources may additionally waste energy and harm the environment. For example, additional network resources often involve large energy requirements (e.g., for powering wireless sites) and can be harmful to the environment (e.g., due to the construction of such network resources). Without a mechanism to accurately account for network performance metrics of users, misappropriated network resources may need to be relocated or removed altogether to better serve populations within geographic areas to which they were intended, further amplifying wastefulness.

In light of these and other problems with existing solutions and systems, there is a need for accurately determining which geographic areas need additional network resources. Furthermore, there is a need to accurately determine user mobility with respect to network coverage. Moreover, there is a need to determine whether to deploy additional network resources to geographic areas based on accurate user-mobility information.

The inventors have developed a system for improving telecommunications network performance. For instance, the inventors have developed a network resource deployment system that generates an accurate set of neighboring geographic areas using unique user-mobility data that satisfies a user-mobility metric to effectively and accurately determine which geographic areas to deploy network resources to. As such, the system can select a geographic area that satisfies a network-ready condition. For example, the geographic area may be considered cellular or satellite network-ready, indicating that the geographic area includes a level of cellular/satellite network coverage and connectivity. The system can then obtain user-mobility data indicating movement of user locations from the selected geographic area to other geographic areas that satisfy a network-traffic condition. The user-mobility data aids in determining whether to deploy telecommunications network resources to the selected geographic area by indicating which other geographic areas users frequently travel to, thereby indicating that the selected geographic area may benefit the most from telecommunications network resources.

The system can filter the set of neighboring geographic areas using a threshold distance (e.g., with respect to the selected geographic area) to reduce inaccurate user-mobility data caused by special events (e.g., such as holidays, vacation, travel, or other events). Additionally, by filtering the set of neighboring geographic areas, the system reduces the amount of computer processing and memory resources required to determine user-mobility metrics as opposed to considering all geographic areas within a threshold distance of the selected geographic area. Using the filtered set of neighboring geographic areas, the system determines a user-mobility metric to determine an amount of users that moves from the selected geographic area to the other geographic areas that satisfies the network ready condition (e.g., geographic areas that are cellular/satellite network ready). In response to the user-mobility metric satisfying a threshold value, the system deploys one or more telecommunications network resources to the selected geographic area. In this way, the system reduces the amount of misappropriated network resources that additionally waste energy and harm the environment. Moreover, in this way, the system accurately determines which geographic areas to deploy network resources to, thereby enhancing the user experience of users in such geographic areas via increased network connectivity and coverage.

In various implementations, the methods and systems described herein can improve telecommunications network performance. For example, the system can select a geographic area from a set of geographic areas, where the geographic area satisfies a network-ready condition. The system can obtain, from a third-party resource, user-mobility data indicating movement of user locations from the selected geographic area to other geographic areas. The system can generate a set of neighboring geographic areas using the user-mobility data, where each neighboring geographic area of the set of geographic areas satisfies a network-traffic condition. The system can filter the set of neighboring geographic areas using a threshold distance, where each neighboring geographic area of the filtered set of neighboring geographic areas is within the threshold distance of the selected geographic area. The system can determine a user-mobility metric for the selected geographic area using the user-mobility data by computing a user-mobility-value of users traveling from the selected geographic area to each of the neighboring geographic areas of the filtered set of geographic areas that satisfies the network-ready condition. In response to the user-mobility metric satisfying a user-mobility metric threshold value, the system can deploy one or more telecommunications network resources to the selected geographic area.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, a radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over an LTE/long-term evolution-advanced (LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNB" is used to describe the base stations 102, and in 5G NR networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a UE, a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) (e.g., using unpaired spectrum resources) operation. In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
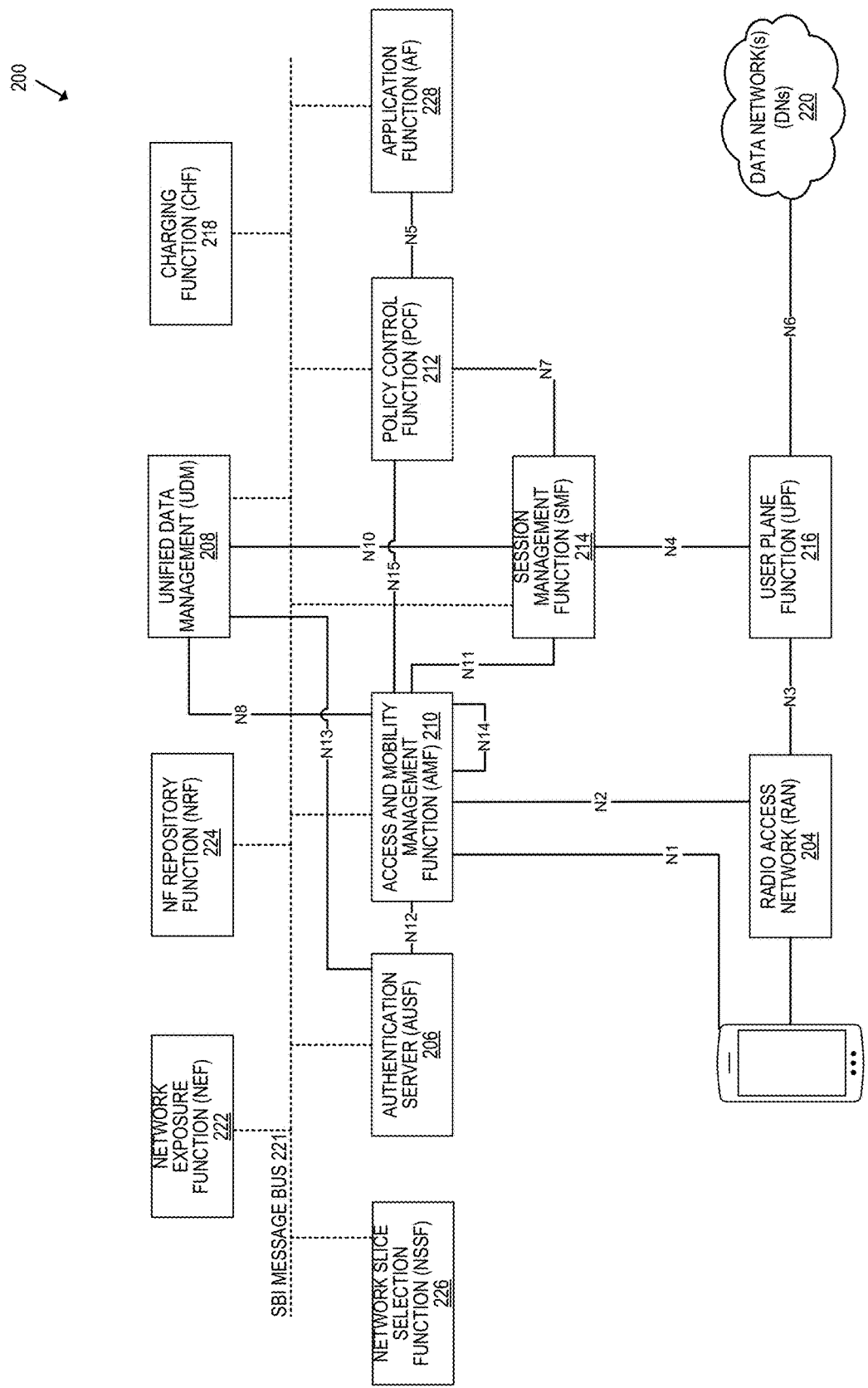
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain a voluminous amount of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge computing cloud environment and a single point of entry for a cluster of NFs once they have been successfully discovered by the NRF 224. This allows the SCP to become the delegated discovery point in a data center, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Improvinq Telecommunications Network Performance

Figure 3:
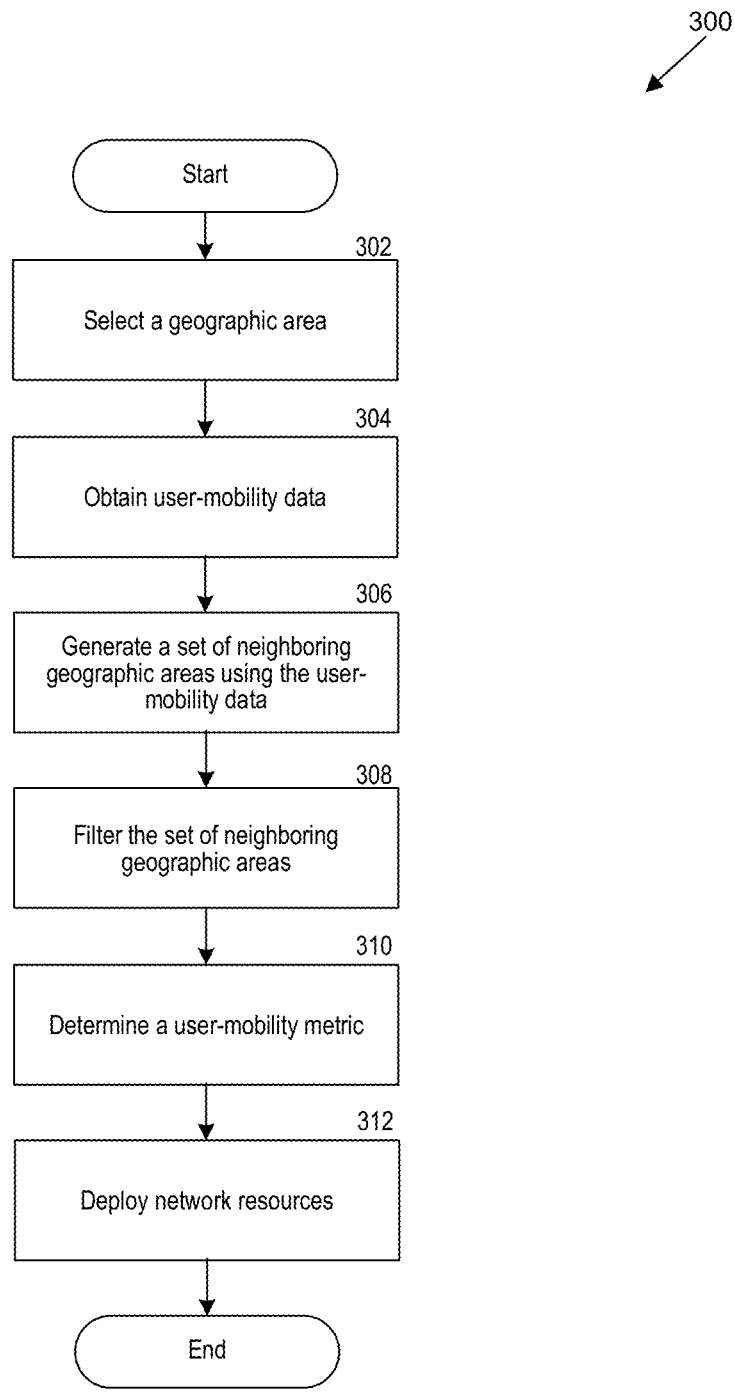
FIG. 3 is a flowchart illustrating a process for improving telecommunications network performance, in accordance with one or more implementations of the present technology.

FIG. 3 is a flowchart illustrating a process 300 for improving telecommunications network performance, in accordance with one or more implementations of the present technology.

At act 302, process 300 can select a geographic area. For example, to provide or deploy telecommunications network-related resources that enhance wireless network connectivity and coverage to geographic areas, process 300 selects a geographic area from a set of geographic areas that satisfies a network-ready condition. The geographic areas may be geographic regions that are separate from one another. For instance, geographic areas may be distinct from one another based on country boundaries, state boundaries, city boundaries, county boundaries, ZIP Code boundaries, census block group boundaries, census block boundaries, or other geographically related boundaries. In some implementations, the geographic areas are combined to form an updated geographic area. For example, two counties may be combined together to form an updated geographic area with respect to other counties, states, ZIP Codes, or other geographic areas. That is, a geographic area may be a geographical region that is separate from one or more other geographical regions.

In some implementations, process 300 selects a geographic area that satisfies a network-ready condition. For example, where a set of geographic areas are each bounded by census block group boundaries, process 300 identifies a census block group from the set of census block groups that satisfies a network-ready condition. As used herein, the network-ready condition indicates whether a geographic region is network ready, which may be based on a network readiness score, churn data, coverage data, correlation between churn data and coverage metrics, or other data or conditions. Examples of network-ready condition(s) and how network-ready conditions are satisfied are provided in, for example, U.S. Pat. No. 11,523,289, the contents of which are incorporated herein in their entirety.

Figure 4:
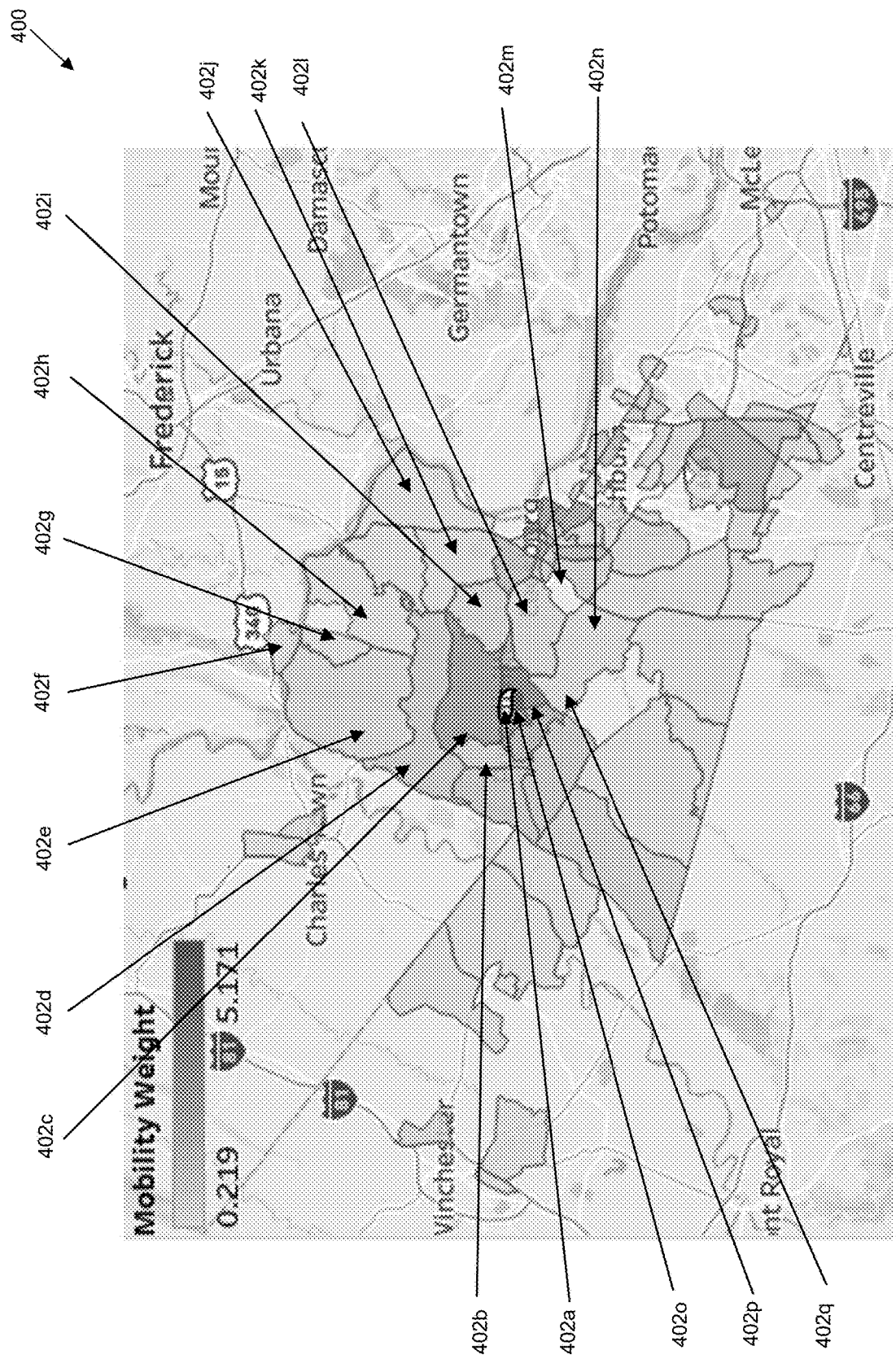
FIG. 4 illustrates a set of geographic areas with respect to user-mobility data, in accordance with one or more implementations of the present technology.

Referring to FIG. 4 showing a set of geographic areas 400 with respect to user-mobility data, process 300 selects first geographic area 402a from the set of geographic areas 402a-402q. It should be noted that, for sake of brevity, not all geographic areas of the set of geographic areas are labeled and others do/may exist. In this example, each geographic area of the set of geographic areas 402a-402q represent census block groups (e.g., a combination of one or more census blocks). Each geographic area of the set of geographic areas 402a-402q are geographically distinct from one another. That is, geographic areas 402a-402q do not overlap geographical boundaries. However, the set of geographic areas 402a-402q can be combined to generate a new set of geographic areas to be considered, in accordance with one or more implementations of the present technology. In this way, by selecting a geographic area that satisfies the network-ready condition, the system identifies a geographic area that will benefit from additional network resources.

As opposed to existing systems that merely deploy a large amount of network resources to a geographic area that is not network-ready, the system accurately determines which geographic areas of a set of geographic areas are network ready. In this way, providing additional network resources to enhance wireless network connectivity and coverage may be provided and/or deployed efficiently. By doing so, the system may reduce the amount of energy used by network resources (e.g., cell sites, cell towers, cellular service provider locations) and reduce the environmental impact of deploying such network resources (e.g., due to the construction of such network resources). For instance, as such network resources require network resources to be deployed within the vicinity of each other to provide enhanced wireless network coverage and connectivity, geographic areas that are network ready are better candidates for providing additional network resources when viewed from the lens of energy and environmental impact.

Referring back to FIG. 3, at act 304, process 300 can obtain user mobility data. For example, process 300 can obtain, from a third-party resource, user mobility data indicating movement of user locations from the selected geographic area to other geographic areas. As used herein, "user" (or collectively "users") may refer to users of network carriers (e.g., all known cellular-network carriers, satellite communication carriers), a given cellular/satellite network carrier, or other person that is associated with cellular/satellite networks. The third-party resource can be a crowdsourced data resource such as Ookla, SafeGraph, or other crowdsourced data resource. Additionally or alternatively, the third-party resource can be the Internet, where information is web scraped pertaining to users moving from one location to another.

As an example, the third-party resource can store or host data that indicates users' movements from one location to another location with respect to wireless network carriers. For example, as cellular-network carriers and crowdsourced data services store anonymous information pertaining to (i) users' cellular-network carrier(s) and (ii) locations that the users move to/from, process 300 obtains such information to determine user mobility data. The user mobility data indicates the movement of user locations from a given geographic location (e.g., the selected geographic area) to other geographic areas (e.g., the set of geographic areas). Additionally, the third-party resource may be based on mobile device application usage, social-media-derived location information, and/or web-mapping platform information. For example, one or more third-party resources may aggregate mobile device application usage, such as which users are using certain mobile device applications (e.g., via device serial numbers, device identification numbers, device platform identifiers, etc.), where the users are using the applications (e.g., Global Positioning System (GPS) coordinates, relative locations, cellular-tower identifiers, etc.), or other mobile device application usage data. Social-media-derived location information may be aggregated by third-party resources that also identify users and their movements from one location to another location. Additionally, web-mapping platforms may also indicate location information of users and where they travel to/from. As such, in some implementations, process 300 may obtain the user-mobility data by querying or otherwise requesting such information from the third-party resource(s) to obtain movement of user locations from the selected geographic area to other geographic areas.

For context, the system obtains such user mobility data to determine which users in which geographies are moving from one geographic area (e.g., of the selected geographic area) to other geographic area(s). In some implementations, the other geographic area(s) are network ready geographic areas and are within a threshold distance of the selected geographic area. Such user mobility data may provide insight as to which geographic areas users are traveling to and which geographic areas users are seeking better cellular-network coverage in.

At act 306, process 300 can generate a set of neighboring geographic areas using the user-mobility data. For example, process 300 can generate a set of neighboring geographic areas using the user mobility data, where each neighboring geographic area of the set of geographic areas satisfies a network-traffic condition. The network-traffic condition indicates a volume of users that move from the selected geographic area to a respective neighboring geographic area of the set of geographic areas. The network-traffic condition can be a value, such as a percentage, integer, decimal, or other value indicating an amount of outflow traffic from the selected geographic area. For example, where the network-traffic condition is 80%, a neighboring geographic area (with respect to the selected geographic area) may include 80% of users' movements from the selected geographic area to the neighboring geographic area. That is, a given geographic area may satisfy the network-traffic condition when 80% or more of users within the geographic area are from the selected geographic area.

To generate (or otherwise identify) the set of neighboring geographic areas, process 300 may use the user-mobility data to determine which geographic areas of the set of geographic areas satisfy the network-traffic condition. For instance, referring to FIG. 4, process 300 may determine which geographic areas of the set of geographic areas 402a-402q satisfy the network-ready condition. In one use case, where first geographic area 402a is the selected geographic area, process 300 may use the user-mobility data to determine a set of neighboring geographic areas. For instance, process 300 may determine for each geographic area of the set of geographic areas whether the user mobility data corresponding to the geographic area satisfies the network-traffic condition. As an example, process 300 may determine whether second geographic area 402b is associated with user-mobility data that satisfies the network-traffic condition. Where second geographic area 402b is associated with a user-mobility of 85% (e.g., indicating that 85% of users within the second geographic area 402b are from the selected geographic area) and the network-traffic condition is 80%, process 300 may determine that the second geographic area 402b satisfies the network-traffic condition. As the second geographic area 402b satisfies the network-traffic condition, process 300 may identify the second geographic area 402b as a neighboring geographic area. Additionally or alternatively, process 300 may add the second geographic area 402b to the set of neighboring geographic areas. Process 300 may perform such steps iteratively for each geographic area of the set of geographic areas 402a-402q to generate (or otherwise identify) the set of neighboring geographic areas.

In some implementations, the network-traffic condition is associated with a predetermined time period of user-mobility data. The predetermined time period may be a time period range such as one month, two months, three months, one year, two years, or other predetermined time range. As user-mobility data indicates which geographic areas users travel to, thereby providing insight as to which users may benefit from better wireless network coverage, the network-traffic condition may be associated with a time period due to the ever-changing behavior of users and the areas they travel to. For instance, a large amount of time may skew results as to whether a given geographic area is traveled to due to special events, such as holidays, vacations, or other events associated with users traveling habits. Therefore, the network-traffic condition may be associated with a predetermined time period to ensure that neighboring geographic areas are determined effectively and accurately with respect to the latest trends in user-mobility. As an example, where the predetermined time period is three months, process 300 may determine a set of neighboring geographic areas using the last three months of user-mobility data with respect to the geographic areas. In this way, the system may account for user-mobility trends, thereby determining more accurate neighboring geographic areas and causing an enhanced user experience by way of deploying additional network resources to geographic areas.

In some implementations, process 300 can update the selected geographic area. For example, process 300 determines a size of the selected geographic area. The size may be measured in square feet, square miles, square kilometers, or may be measured by the metric to which the selected geographic area is bounded by (e.g., census block, census block groups, ZIP Code, county, city, state, country, etc.). The size may be determined by querying a database (e.g., local database, remote database, etc.) storing information related to geographic areas, such as names of geographical areas, sizes of geographical areas, etc. Process 300 then determines whether the size of the selected geographic area satisfies a geographic size threshold value. The geographic size threshold value can be a predetermined threshold value that may be measured in square feet, square miles, square kilometers, or may be measured by the metric to which the selected geographic area is bounded by (e.g., census block, census block groups, ZIP Code, county, city, state, country, etc.). The size of the selected geographic area can satisfy the geographic size threshold value where the size of the geographic area meets or exceeds the geographic size threshold value. For example, where the size of the selected geographical area is 10 square miles and the geographic size threshold value is five square miles, then the selected geographic area may satisfy the geographic size threshold value.

Additionally or alternatively, process 300 can update the selected geographic area using a population density of the selected geographic area. For example, process 300 determines a population density of the selected geographic area. The population density may be an integer, decimal, percentage, ratio, or other value. The population density may be determined by querying a database (e.g., local database, remote database, etc.) storing information related to geographical areas, such as names of geographical areas, sizes of geographical areas, population densities of such geographical areas, etc. Process 300 then determines whether the population density of the selected geographic area satisfies a population density threshold value. The population density threshold value may be a predetermined population density threshold value, such as an integer, decimal, percentage, ratio, or other value that may be stored in a database (e.g., local database, remote database, etc.). When the population density of the selected geographic area fails to satisfy the population density threshold value (e.g., the population density fails to meet or exceed the population density threshold value), process 300 updates the selected geographic area to encompass one or more geographic areas of the set of geographic areas.

When the size of the selected geographic area satisfies the geographic size threshold value (or alternatively, the population density of the selected geographic area fails to satisfy the population density threshold value), process 300 updates the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas. For example, large geographic areas, such as small towns and rural areas, may have little to no resources nearby (e.g., network resources, shopping centers, grocery stores, neighbors, workplaces, etc.). As these larger geographic areas can also be associated low population densities and users traveling farther to resources or other locations of interest, accurate user-mobility data may be difficult to obtain. This causes difficulties when accurately generating (or otherwise determining) a set of neighboring geographic areas to determine whether a given (e.g., selected) geographic area may benefit from telecommunications resources (e.g., as determining the neighboring geographic areas can rely on the user-mobility data). Thus, by updating the selected geographic area to encompass other, non-selected geographic areas when the selected geographic area is large, the system may accurately determine whether network resources will enhance the user experience in sparsely populated, large geographic areas.

As an example, referring to FIG. 4, where the selected geographic area is first geographic area 402a, and first geographic area 402a satisfies the geographic size threshold value (or alternatively, the first geographic area 402a has a population density that fails to satisfy the population density threshold value), process 300 updates the selected geographic area 402*a*. For instance, process 300 can update the selected geographic area 402*a* to encompass second geographic area 402*b*, third geographic area 402*c*, ninth geographic area 402*i*, and twelfth geographic area 402*l*. The other geographic areas 402*d*-402*h*, 402*j*-402*k*, and 402*m*-402*q* that are not part of the updated selected geographic area may additionally be updated to encompass one or more geographic areas. In some implementations, process 300 updates the selected geographic area 402*a* to encompass other geographic areas by adding a geographic area one at a time until the updated selected geographic area satisfies a network-ready condition.

For instance, process 300 may update the selected geographic area 402*a* by encompassing the second geographic area 402*b* and then determining whether the updated selected geographic area satisfies the network-ready condition. When the updated selected geographic area does not satisfy the network-ready condition, process 300 updates the selected geographic area to additionally encompass the third geographic area 402*c*. When the updated selected geographic area satisfies the network-ready condition, then process 300 stops updating the selected geographic area to encompass other geographic areas. In this example, however, process 300 updates the selected geographic area 402*a* by encompassing second geographic area 402*b*, third geographic area 402*c*, ninth geographic area 402*i*, and twelfth geographic area 402*l*.

In some implementations, process 300 can select geographic areas to be part of (or otherwise be encompassed by) the selected geographic area based on a threshold distance from a centroid of the geographic area. For example, when process 300 updates the selected geographic 402*a* to encompass second geographic area 402*b*, process 300 determines a centroid of the selected geographic area 402*a* and determines whether second geographic area 402*b* is within a threshold distance (e.g., feet, miles, kilometers, etc.) of the centroid of the selected geographic area 402*a*. When the second geographic area 402*b* is within the threshold distance of the centroid of the selected geographic area 402*a*, process 300 may select the second geographic area 402*b* as a candidate to be part of the updated selected geographic area 402*a*. Such process may repeat iteratively for each geographic area to update the selected geographic area 402*a*.

At act 308, process 300 can filter the set of neighboring geographic areas. For example, process 300 filters the set of neighboring geographic areas using a threshold distance, where each neighboring geographic area of the filtered set of neighboring geographic areas is within the threshold distance of the selected geographic area. The threshold distance may be a predetermined distance such as 1, 2, 3, . . . , 80, 100, . . . , 1,000, mile(s)/kilometer(s)/feet/centimeter(s)/other metric. Process 300 can determine a centroid (e.g., the center) of the selected geographic area and the set of neighboring geographic areas to determine whether a respective neighboring geographic area is within a threshold distance of the selected geographic area (e.g., with respect to the centroid of the selected geographic area and the respective neighboring geographic area). When a respective neighboring geographic area is determined to be within the threshold distance of the selected geographic area, process 300 may add the respective neighboring geographic area to be part of the set of filtered geographic areas. That is, the set of filtered neighboring geographic areas can include neighboring geographic areas that are within the threshold distance of the selected geographic area. In this way, the system filters outliers of users traveling long distances for special events, such as holidays, vacations, or other leisurely activities. Furthermore, by filtering the outliers, the system reduces the amount of computer processing and memory resources utilized that would otherwise be wasted on processing inaccurate data.

As an example, referring to FIG. 4, where the set of neighboring geographic areas are second geographic area 402*b*, third geographic area 402*c*, fourth geographic area 402*d*, fifth geographic area 402*e*, twelfth geographic area 402*l*, and fourteenth geographic area 402*n*, process 300 may filter the set of neighboring geographic areas such that the filtered set of neighboring geographic areas is within the threshold distance. For instance, from the set of neighboring geographic areas, second geographic area 402*b*, third geographic area 402*c*, and twelfth geographic area 402*l* may be part of the filtered set of neighboring geographic areas (e.g., as such geographic areas are determined to be within the threshold distance of selected geographic area 402*a*), where fourth geographic area 402*d*, fifth geographic area 402*e*, and fourteenth geographic area 402*n* are not part of the set of filtered geographic areas (e.g., as such geographic areas are determined to not be within the threshold distance of selected geographic area 402*a*).

In some implementations, the threshold distance may be dynamically updated. For example, to accurately determine which geographic areas network resources are to be deployed to, it is advantageous to account for network readiness of neighboring geographic areas. For instance, users traveling to network-ready geographies benefit from additional network resources for completing their day-to-day tasks as described above. Additionally, users traveling to network-ready geographies can indicate that such users seek better network coverage and connectivity. Thus, process 300 can determine a number of neighboring geographic areas of the set of geographic areas that satisfy the network-ready condition. As an example, referring to FIG. 5, where the set of neighboring geographic areas 500 are second geographic area 502*b*, third geographic area 502*c*, fourth geographic area 502*d*, fifth geographic area 502*e*, twelfth geographic area 502*l*, and fourteenth geographic area 502*n* (which respectively correspond to the geographic areas of FIG. 4), process 300 may determine a number of neighboring geographic areas that satisfy the network-ready condition. For instance, process 300 determines that second geographic area 502*b*, third geographic area 502*c*, fifth geographic area 502*e*, and twelfth geographic area 502*l* satisfy the network-ready condition while fourth geographic area 502*d* and fourteenth geographic area 502*n* do not satisfy the network-ready condition. Thus, process 300 determines that there are four neighboring geographic areas that satisfy the network-ready condition.

Process 300 then determines whether the number of neighboring geographic areas of the set of geographic areas satisfies a network-ready condition threshold. To ensure that there is an adequate number of neighboring geographic areas that satisfies the network-ready condition (e.g., to accurately determine whether to deploy network resources to the selected geographic area 502*a*, which may correspond to first/selected geographic area 402*a* (FIG. 4)), process 300 compares the number to the network-ready condition threshold. The network-ready condition threshold may be a predetermined value (e.g., an integer, decimal, ratio, percentage, etc.) that indicates a threshold number of network-ready geographic areas. As such, when the number of neighboring geographic areas fails to satisfy the network-ready condition threshold (e.g., by failing to meet or exceed the network-ready condition threshold), process 300 may update the threshold distance to another threshold distance that is greater than that of the original threshold distance. For example, the other threshold distance may be a predetermined threshold distance that is retrieved from a database (e.g., a local database, remote database, etc.). In this way, by updating the threshold distance to a larger distance, the system may account for trends in user-mobility to additional network-ready areas, thereby improving the accuracy of determining which geographic areas additional network resources are to be deployed to.

At act 310, process 300 can determine a user-mobility metric. For example, process 300 determines a user-mobility metric for the selected geographic area using the user-mobility data by computing a user-mobility-value of users traveling from the selected geographic area to each of the neighboring geographic areas of the filtered set of geographic areas that satisfies the network-ready condition. In some implementations, the user-mobility metric can be a percentage of users that move (e.g., travel, commute, etc.) from the selected geographic area 502a to a neighboring geographic area of the set of filtered geographic areas that is network-ready (e.g., satisfies the network-ready condition). In other implementations, the user-mobility metric can be a percentage of users that move from the selected geographic area 502a to each of the neighboring geographic areas of the set of filtered geographic areas (e.g., collectively) that is network-ready. For instance, the user-mobility metric may represent a probability that a user from the selected geographic area 502a is likely to travel to neighboring geographic area that is network ready.

Such user-mobility metric is advantageous to determine as geographic areas associated with a high user-mobility metric indicate that such geographic areas can benefit the most from additional network resources. Not only does this improve the user experience (e.g., by deploying network resources to geographic areas where user-mobility metrics to network-ready areas are high) but also reduces the environmental impact of deploying network resources to geographic areas. For instance, as opposed to existing systems that sporadically place network resources in a region based solely on whether the region has low network performance, the system leverages unique data to effectively and efficiently provide additional network resources to underserved geographic areas where the deployment of resources (i) has a minimal environmental impact and (ii) improves the user experience of users within the underserved geographic areas.

Figure 5:
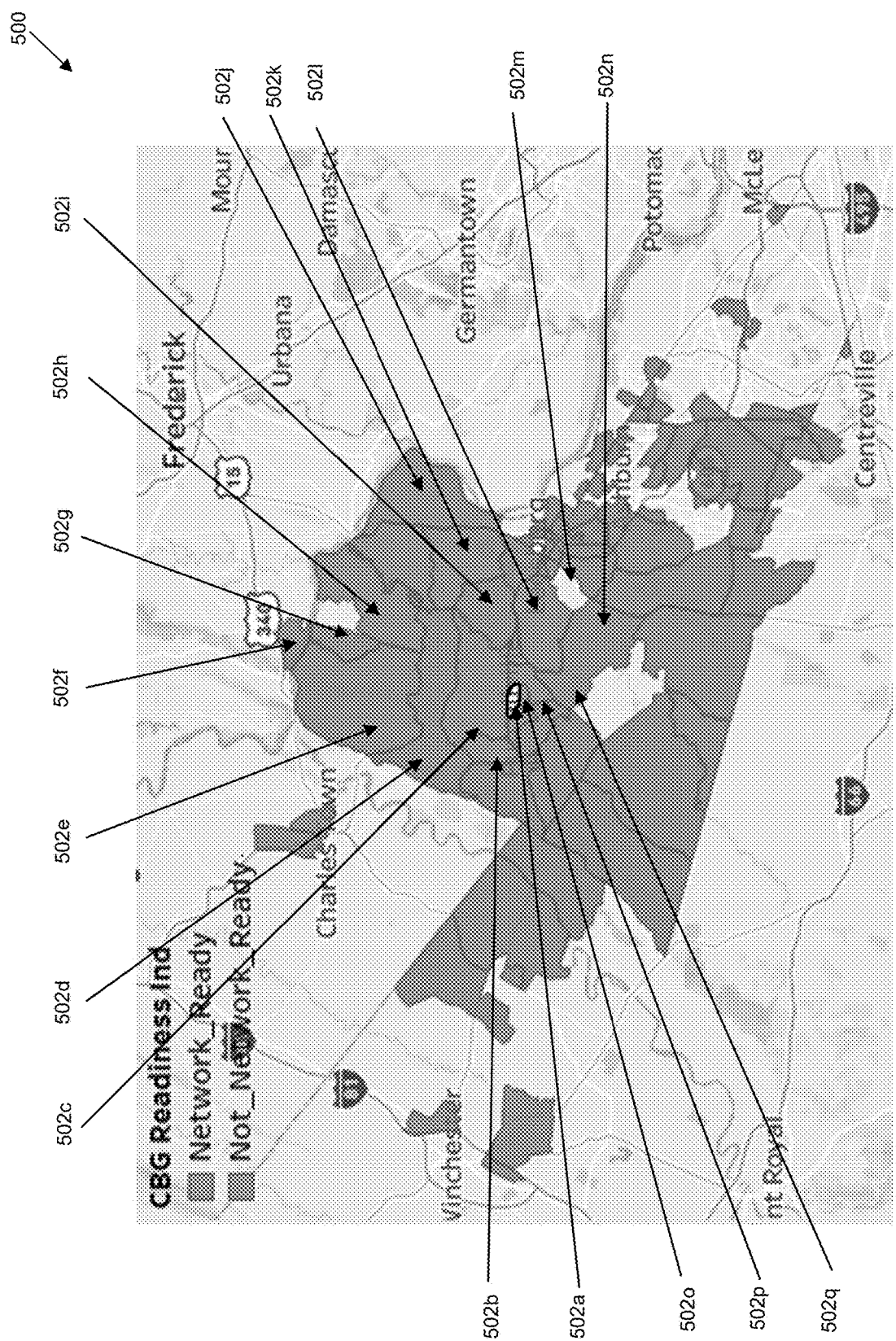
FIG. 5 illustrates a set of geographic areas with respect to network readiness, in accordance with one or more implementations of the present technology.

As an example, referring to FIG. 5, process 300 determines a user-mobility metric for selected geographic area 502a. Process 300 can compute a user-mobility-value of users that travel from selected geographic area 502a to each of the neighboring geographic areas of the filtered set of geographic areas that satisfies the network-ready condition. For instance, where the filtered set of geographic areas that satisfies the network-ready condition includes second geographic area 502b, third geographic area 502c, fifth geographic area 502e, and twelfth geographic area 502l, process 300 may determine that 30% of users travel from the selected geographic area 502a to second geographic area 502b, 20.7% of users travel from the selected geographic area 502a to third geographic area 502c, 10.1% of users travel from the selected geographic area 502a to fifth geographic area 502e, and 20.3% of users travel from the selected geographic area 502a to twelfth geographic area 502l. In some implementations, process 300 may determine that the user-mobility metric is 81.1% (e.g., by adding the individual user-mobility-values of the respective geographic areas), indicating that there is a 81.1% probability that a user from the selected geographic area 502a will travel to a neighboring geographic area of the filtered set of neighboring geographic areas that satisfies the network-ready condition. In other implementations, process 300 may compute an average/weighted average of the individual user-mobility-values to determine the user-mobility metric.

At act 312, process 300 can deploy network resources. For example, in response to the user-mobility metric satisfying a user-mobility metric threshold value, process 300 deploys one or more telecommunications resources to the selected geographic area. The user-mobility metric threshold value can be a predetermined threshold value such as a predetermined integer, percentage, ratio, decimal, or other value. As an example, where the user-mobility metric threshold value is a predetermined percentage value, the user-mobility threshold value may be set to 60%. In some implementations, the user-mobility metric threshold value can be a dynamic value based on the threshold distance. For example, the user-mobility metric threshold value may correspond to the threshold distance (e.g., as discussed in act 308), where the user-mobility metric threshold value is increased based on the threshold distance being increased (e.g., from the original threshold distance value) and may be decreased based on the threshold distance being decreased (e.g., from the original threshold distance value). The user mobility threshold value may be satisfied when a user-mobility metric meets or exceeds the user-mobility metric threshold value.

For instance, referring back to FIG. 5 and continuing with the example above, where the user-mobility metric indicates that there is an 81.1% probability that a user from the selected geographic area 502a will travel to a neighboring geographic area of the filtered set of neighboring geographic areas that satisfies the network-ready condition, process 300 compares the user-mobility metric to the user-mobility metric threshold value. Where the user-mobility metric threshold value is set to 60%, process 300 determines that the user-mobility metric of the selected geographic area 502a satisfies the user-mobility metric threshold value. In response, process 300 deploys one or more telecommunications network resources to the selected geographic area 502a.

The one or more telecommunications network resources can be a telecommunications network antenna (e.g., a cellular-network antenna, a satellite for satellite communications), a telecommunications network service location (e.g., a cellular-carrier store, a cellular-carrier support center, a cellular-carrier repair store, a satellite communications store, a satellite-carrier support center, etc.), a telecommunications network site (e.g., a cell site, a satellite site), or other telecommunications network resource. In this way, the system provides enhanced network resources to underserved geographic areas that benefit the most from such network resources while reducing the amount of energy consumption and the environmental impact associated with providing such network resources.

Computer System

Figure 6:
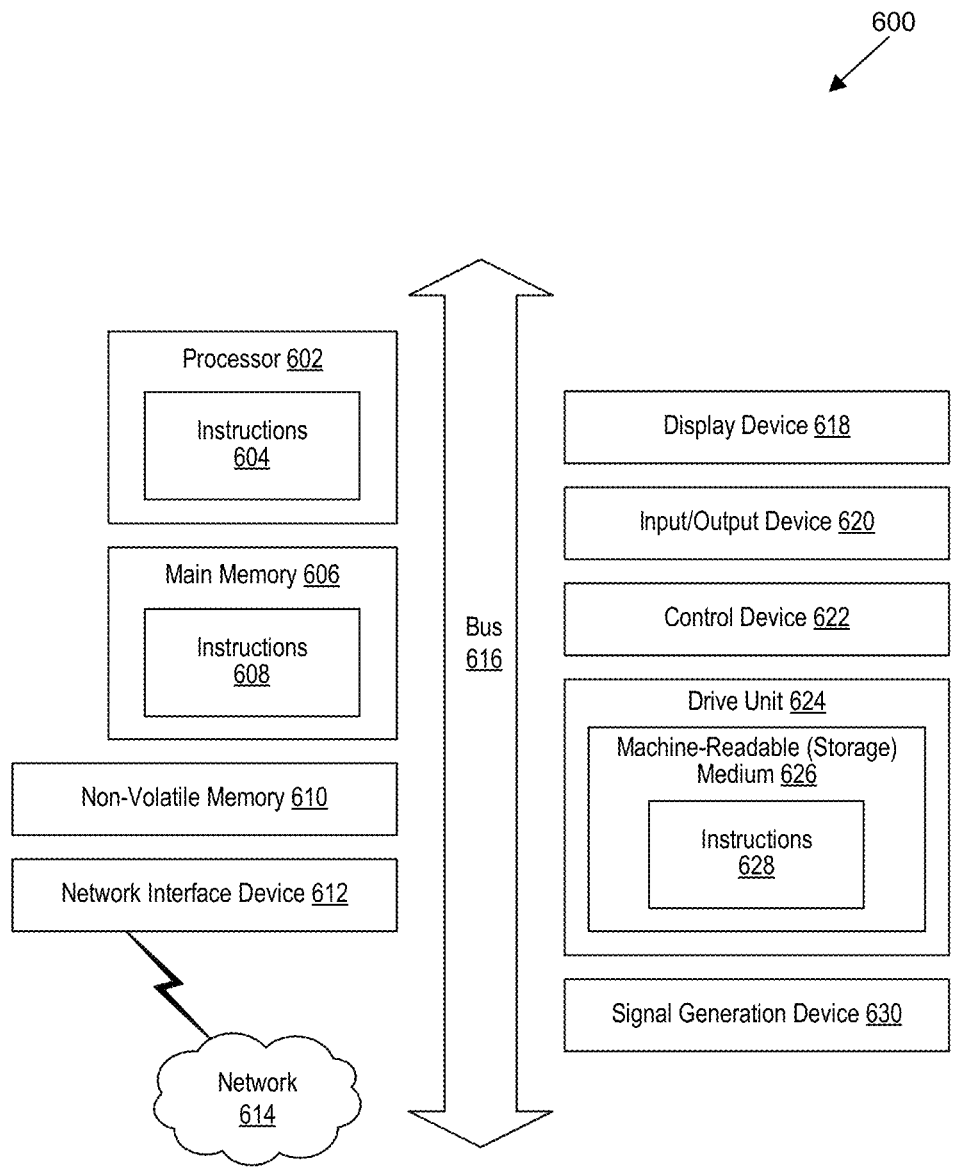
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for improving telecommunications network performance, the method comprising:
   selecting a geographic area from a set of geographic areas, wherein the geographic area satisfies a network-ready condition;
   obtaining, from a third-party resource, user-mobility data indicating movement of user locations from the selected geographic area to other geographic areas;
   generating a set of neighboring geographic areas using the user-mobility data, wherein each neighboring geographic area of the set of geographic areas satisfies a network-traffic condition;
   filtering the set of neighboring geographic areas using a threshold distance, wherein each neighboring geographic area of the filtered set of neighboring geographic areas is within the threshold distance of the selected geographic area;
   determining a user-mobility metric for the selected geographic area using the user-mobility data by computing a user-mobility-value of users traveling from the selected geographic area to each of the neighboring geographic areas of the filtered set of geographic areas that satisfies the network-ready condition; and
   responsive to the user-mobility metric satisfying a user-mobility metric threshold value, deploying one or more telecommunications network resources to the selected geographic area.

2. The method of claim 1, wherein the network-traffic condition indicates a volume of users that move from the selected geographic area to a respective neighboring geographic area of the set of geographic areas.

3. The method of claim 1, wherein the network-traffic condition is associated with a predetermined time period of user-mobility data.

4. The method of claim 1, further comprising:
   determining a size of the selected geographic area; and
   in response to the size of the selected geographic area satisfying a geographic size threshold value, updating the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

5. The method of claim 1, further comprising:
   determining a population density of the selected geographic area; and
   in response to the population density of the selected geographic area failing to satisfy a population density threshold value, updating the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

6. The method of claim 1, wherein the user-mobility data is based on at least one of (i) mobile device application usage, (ii) social-media-derived location information, or (iii) web-mapping platform.

7. The method of claim 1, further comprising:
   determining a number of neighboring geographic areas of the set of geographic areas that satisfies the network-ready condition; and
   in response to the number of neighboring geographic areas of the set of geographic areas failing to satisfy a network-ready condition threshold, updating the threshold distance to a second threshold distance that is greater than that of the threshold distance.

8. The method of claim 1, wherein the one or more telecommunications network resources comprise at least one of (i) a telecommunications network antenna, (ii) a telecommunications network service location, or (iii) a telecommunications network site.

9. A system for improving telecommunications network performance comprising:
   at least one hardware processor; and
   at least one non-transitory memory storing instructions, which, when executed by the
      at least one hardware processor, cause the system to:
         select a geographic area from a set of geographic areas, wherein the geographic area satisfies a network-ready condition;

obtain, from a third-party resource, user-mobility data indicating movement of user locations from the selected geographic area to other geographic areas;

generate a set of neighboring geographic areas using the user-mobility data, wherein each neighboring geographic area of the set of geographic areas satisfy a network-traffic condition;

filter the set of neighboring geographic areas using a threshold distance, wherein each neighboring geographic area of the filtered set of neighboring geographic areas is within the threshold distance of the selected geographic area;

determine a user-mobility metric for the selected geographic area using the user-mobility data by computing a user-mobility-value of users traveling from the selected geographic area to each of the neighboring geographic areas of the filtered set of geographic areas that satisfies the network-ready condition; and responsive to the user-mobility metric satisfying a user-mobility metric threshold value, deploy one or more telecommunications network resources to the selected geographic area.

10. The system of claim 9, further comprising the instructions to:

determine a size of the selected geographic area; and in response to the size of the selected geographic area satisfying a geographic size threshold value, update the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

11. The system of claim 9, further comprising the instructions to:

determine a population density of the selected geographic area; and in response to the population density of the selected geographic area failing to satisfy a population density threshold value, update the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

12. The system of claim 9, further comprising the instructions to:

determine a number of neighboring geographic areas of the set of geographic areas that satisfies the network-ready condition; and in response to the number failing to satisfy a network-ready condition threshold value, update the threshold distance to a second threshold distance that is greater than that of the threshold distance.

13. The system of claim 9, further comprising the instructions to:

determine a number of neighboring geographic areas of the set of geographic areas that satisfies the network-ready condition; and in response to the number of neighboring geographic areas of the set of geographic areas failing to satisfy a network-ready condition threshold, update the threshold distance to a second threshold distance that is greater than that of the threshold distance.

14. At least one non-transitory computer-readable storage medium storing instructions, which, when executed by at least one data processor of a system, cause the system to:

selecting a geographic area from a set of geographic areas, wherein the geographic area satisfies a network-ready condition;

obtaining, from a third-party resource, user-mobility data indicating movement of user locations from the selected geographic area to other geographic areas;

generating a set of neighboring geographic areas using the user-mobility data, wherein each neighboring geographic area of the set of geographic areas satisfy a network-traffic condition;

filtering the set of neighboring geographic areas using a threshold distance, wherein each neighboring geographic area of the filtered set of neighboring geographic areas is within the threshold distance of the selected geographic area;

determining a user-mobility metric for the selected geographic area using the user-mobility data by computing a user-mobility-value of users traveling from the selected geographic area to each of the neighboring geographic areas of the filtered set of geographic areas that satisfies the network-ready condition; and responsive to the user-mobility metric satisfying a user-mobility metric threshold value, deploying one or more telecommunications network resources to the selected geographic area.

15. The non-transitory computer-readable storage medium of claim 14, wherein the network-traffic condition indicates a volume of users that move from the selected geographic area to a respective neighboring geographic area of the set of geographic areas.

16. The non-transitory computer-readable storage medium of claim 14, wherein the network-traffic condition is associated with a predetermined time period of user-mobility data.

17. The non-transitory computer-readable storage medium of claim 14, further storing instructions, which, when executed by the at least one data processor of the system, cause the system to:

determining a size of the selected geographic area; and in response to the size of the selected geographic area satisfying a geographic size threshold value, updating the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

18. The non-transitory computer-readable storage medium of claim 14, further storing instructions, which, when executed by the at least one data processor of the system, cause the system to:

determining a population density of the selected geographic area; and in response to the population density of the selected geographic area failing to satisfy a population density threshold value, updating the selected geographic area to encompass one or more geographic areas of the set of geographic areas such that (i) the updated selected geographic area satisfies the network-ready condition and (ii) the one or more geographic areas that are not part of the updated selected geographic area encompass one or more other geographic areas.

19. The non-transitory computer-readable storage medium of claim 14, wherein the user-mobility data is based on at least one of (i) mobile device application usage, (ii) social-media-derived location information, or (iii) web-mapping platform.

20. The non-transitory computer-readable storage medium of claim 14, wherein the one or more telecommunications network resources comprise at least one of (i) a telecommunications network antenna, (ii) a telecommunications network service location, or (iii) a telecommunications network site.

* * * * *